(12) United States Patent
Araki et al.

(10) Patent No.: US 10,600,561 B2
(45) Date of Patent: Mar. 24, 2020

(54) COIL DEVICE

(71) Applicant: IHI CORPORATION, Tokyo (JP)

(72) Inventors: Jun Araki, Tokyo (JP); Motonao Niizuma, Tokyo (JP); Susumu Tokura, Tokyo (JP); Kentaro Furiya, Tokyo (JP); Toshio Nakamura, Tokyo (JP); Kenji Nishimura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/579,133

(22) PCT Filed: May 25, 2016

(86) PCT No.: PCT/JP2016/065481
§ 371 (c)(1),
(2) Date: Dec. 1, 2017

(87) PCT Pub. No.: WO2016/194739
PCT Pub. Date: Dec. 8, 2016

(65) Prior Publication Data
US 2018/0166210 A1    Jun. 14, 2018

(30) Foreign Application Priority Data

Jun. 4, 2015    (JP) ................................ 2015-114046

(51) Int. Cl.
*H01F 27/34*    (2006.01)
*H01F 29/12*    (2006.01)
(Continued)

(52) U.S. Cl.
CPC ............. *H01F 27/34* (2013.01); *H01F 27/28* (2013.01); *H01F 29/12* (2013.01); *H02J 50/10* (2016.02); *H01F 2027/348* (2013.01)

(58) Field of Classification Search
CPC .......... H01F 27/34; H01F 29/12; H01F 27/28; H01F 38/14; H01F 2027/348; B60L 53/38; H02J 50/10; H02J 50/12
See application file for complete search history.

(56) References Cited

U.S. PATENT DOCUMENTS

2009/0121677 A1    5/2009 Inoue
2013/0221910 A1    8/2013 Kim et al.
(Continued)

FOREIGN PATENT DOCUMENTS

EP    3206281 A1    8/2017
JP    08-238326 A    9/1996
(Continued)

OTHER PUBLICATIONS

International Search Report issued in corresponding International Patent Application No. PCT/JP2016/065481 dated Aug. 23, 2016, consisting of 5 pp. (English Translation Provided).
(Continued)

*Primary Examiner* — Jung Kim
(74) *Attorney, Agent, or Firm* — Volpe and Koenig, P.C.

(57) ABSTRACT

A first coil device includes a first coil portion that faces a second coil portion of a second coil device in a first direction and includes a conductive wire, and at least one nonmagnetic member that includes a protrusion protruding to an outside of the first coil portion in a second direction orthogonal to the first direction. The nonmagnetic member includes an eddy current interrupter that interrupts a part of an eddy current generated in the nonmagnetic member.

5 Claims, 9 Drawing Sheets

(51) Int. Cl.
*H02J 50/10* (2016.01)
*H01F 27/28* (2006.01)

(56) References Cited

U.S. PATENT DOCUMENTS

| 2014/0084697 | A1 | 3/2014 | Yasuda |
| 2014/0306653 | A1 | 10/2014 | Hirobe |
| 2016/0141099 | A1 | 5/2016 | Maekawa |
| 2016/0203905 | A1 | 7/2016 | Hirobe |
| 2017/0103850 | A1 | 4/2017 | Furiya et al. |

FOREIGN PATENT DOCUMENTS

| JP | 2010-093180 A | 4/2010 |
| JP | 2012-084893 A | 4/2012 |
| JP | 2012-099644 A | 5/2012 |
| JP | 2012-134374 A | 7/2012 |
| JP | 2012-199370 A | 10/2012 |
| JP | 2014-096982 A | 5/2014 |
| JP | 2014-121238 A | 6/2014 |
| JP | 2014-225683 A | 12/2014 |
| JP | 2015-042121 A | 3/2015 |
| JP | 6439442 B2 | 12/2018 |
| WO | 2012/099170 A1 | 7/2012 |
| WO | 2015/020141 A1 | 2/2015 |
| WO | WO-2015020141 A1 * | 2/2015 | ............ H01F 38/14 |
| WO | 2015/199151 A1 | 12/2015 |

OTHER PUBLICATIONS

Written Opinion Report issued in corresponding International Patent Application No. PCT/JP2016/065481 dated Aug. 23, 2016, consisting of 5 pp.

* cited by examiner

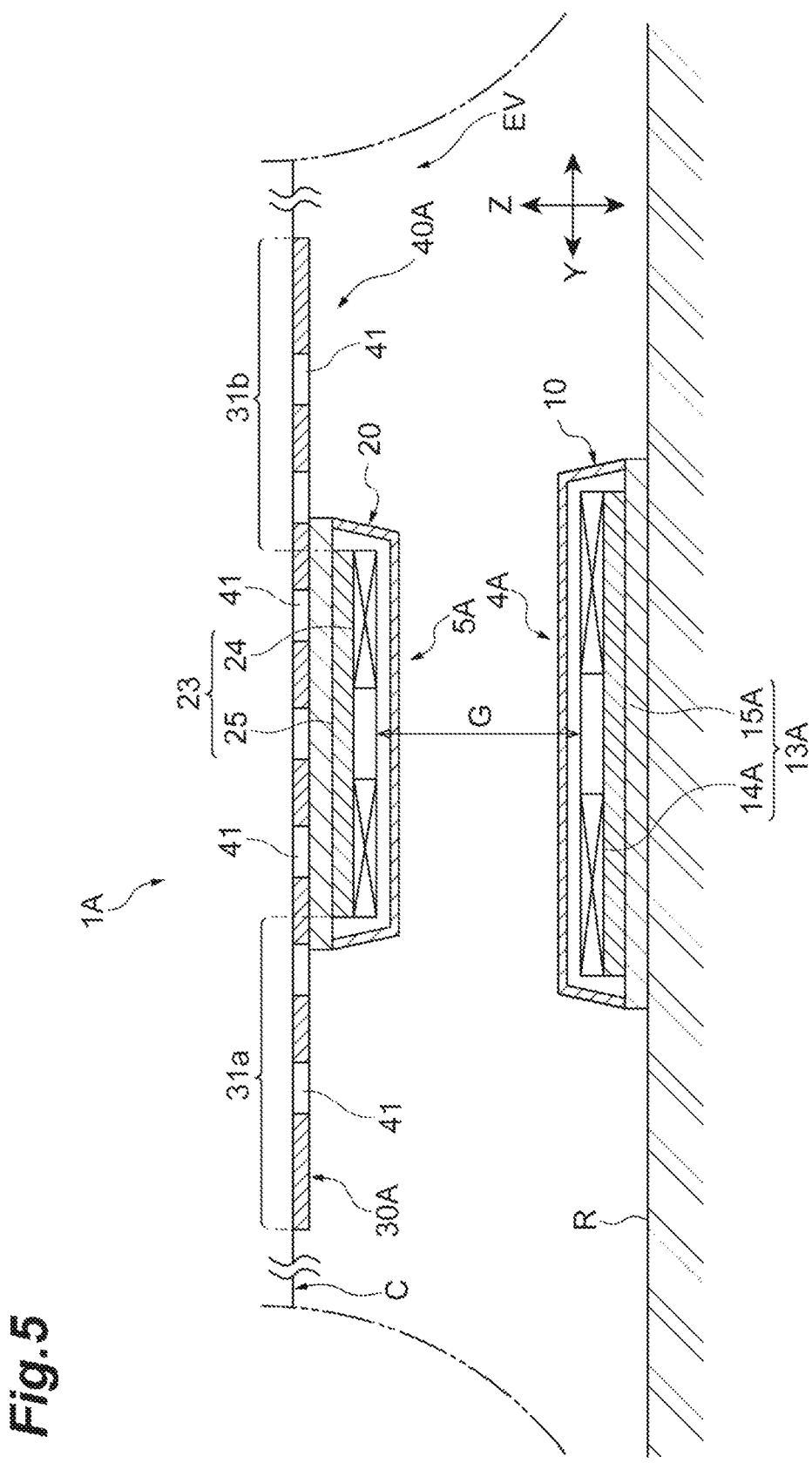

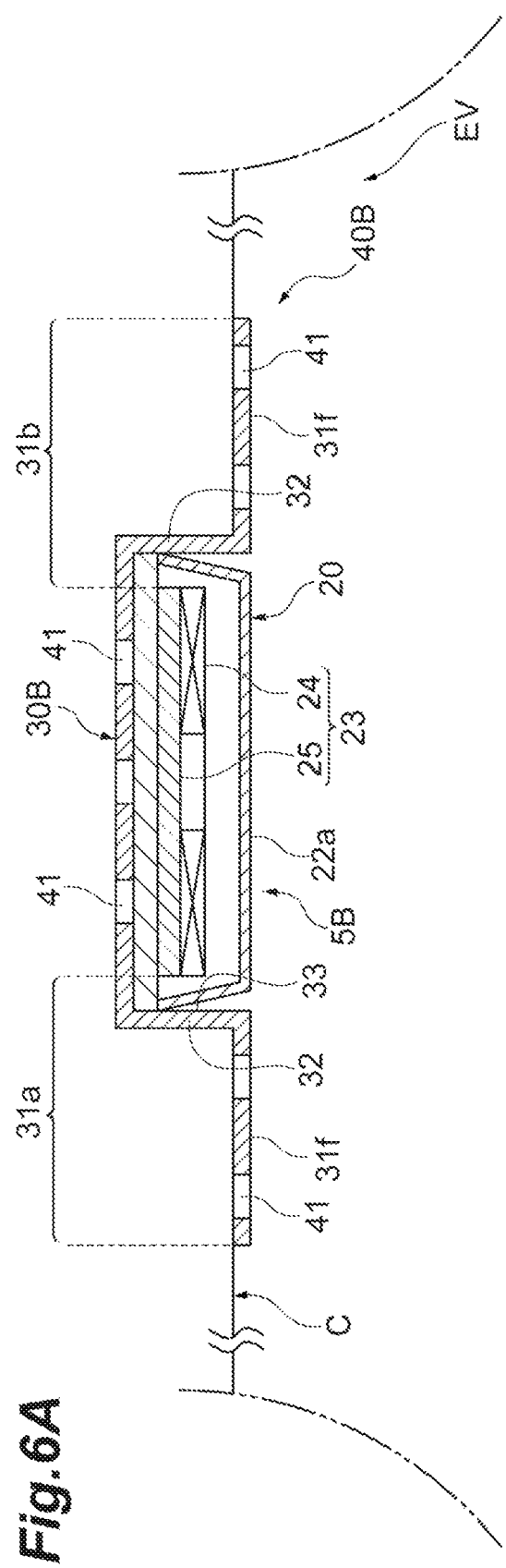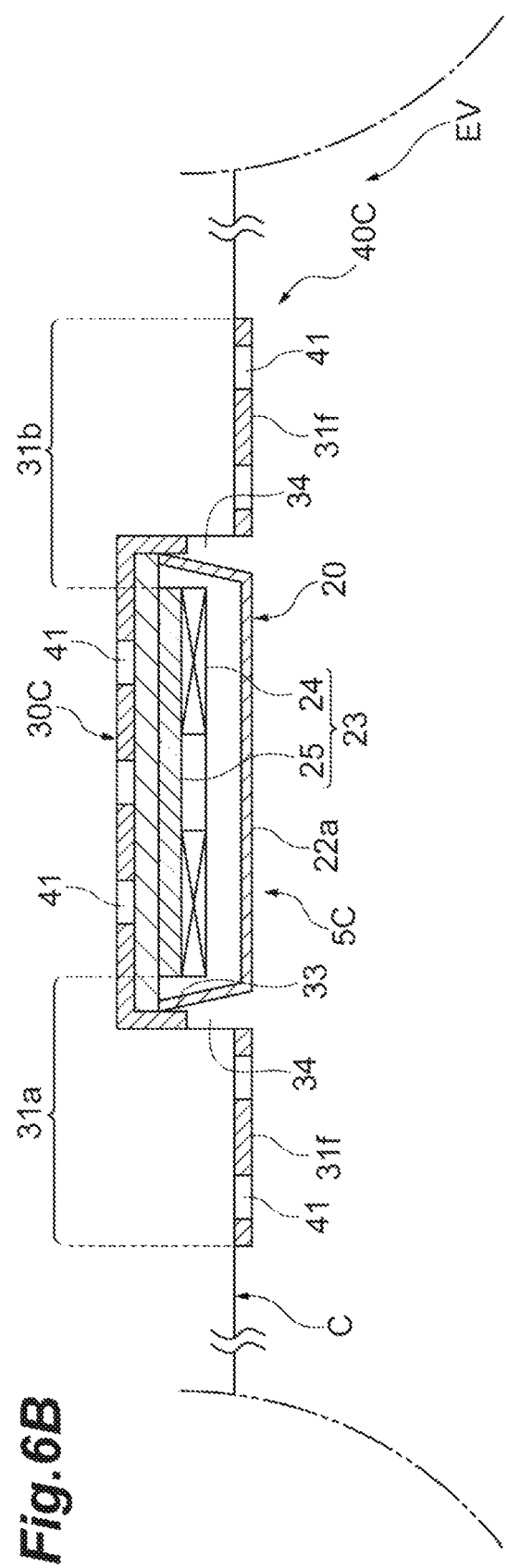

COIL DEVICE

TECHNICAL FIELD

This application relates to a coil device. This application is based upon and claims the benefit of priority from the prior Japanese Patent Application No. 2015-114046, filed on Jun. 4, 2015, the entire content of which is incorporated herein by reference.

BACKGROUND ART

A wireless power transfer system includes a power transmission coil device which is a part of a power transmitter and a power reception coil device which is a part of a power receiver, and implements wireless power transmission using magnetic coupling between coils of an electromagnetic induction scheme, a magnetic resonance scheme, etc. For example, the wireless power transfer system is applied to a power feeding system of an electric vehicle or a plug-in hybrid vehicle. In this case, the power reception coil device is installed in a vehicle.

In a known conventional scheme, a conductive plate, etc. is provided to each of a power transmission coil device and a power reception coil device to prevent magnetic flux from leaking to the surrounding (for example, see Patent Literature 1). The conductive plate (aluminum plate 60) described in Patent Literature 1 is provided to prevent leakage of a magnetic field to the outside. In this way, magnetic flux generated from the power transmission coil device is prevented from passing through an iron plate included in a floor surface of a vehicle.

CITATION LIST

Patent Literature

Patent Literature 1: Japanese Unexamined Patent Publication No. 2014-96982

SUMMARY OF INVENTION

Technical Problem

Incidentally, when a shield larger than a power reception coil is provided in the power reception coil device, magnetic flux generated from a power transmission coil and swollen to the outside is interlinked with the shield. Then, eddy current-dependent magnetic flux is generated, and this magnetic flux cancels the magnetic flux from the power transmission coil. As a result, the magnetic flux returning to the power transmission coil decreases, and an inductance of the power transmission coil decreases.

Here, a height of the power reception coil device from a ground may vary according to a type of a vehicle on which the power reception coil device is mounted or a load amount in the vehicle. When the height of the power reception coil device changes, a distance (gap) between the power transmission coil device and the power reception coil device changes. When the gap changes, the amount of magnetic flux between the coil devices interlinking with the shield changes. In response to change of the amount of magnetic flux interlinking with the shield, the amount of magnetic flux interlinking with the coil changes. That is, the change of the amount of magnetic flux interlinking with the shield causes a change in inductance of the coil. Power transmitted between the coils varies depending on the inductance of the coils, and an optimum inductance value is determined from a viewpoint of transmission power for each system. For this reason, it is desirable to suppress an unintended inductance change.

This disclosure describes a coil device that can suppress a change in inductance of a coil even when a gap changes.

Solution to Problem

A coil device according to an aspect of this disclosure is a first coil device, which faces a second coil device in a first direction and wirelessly performs power transmission or power reception, including a first coil portion that faces a second coil portion of the second coil device in the first direction and includes a conductive wire, and at least one nonmagnetic member that includes a protrusion protruding to an outside of the first coil portion in a second direction orthogonal to the first direction, in which the nonmagnetic member includes an eddy current interrupter that interrupts a part of an eddy current generated in the nonmagnetic member.

Effects of Invention

According to an aspect of this disclosure, a change in inductance of a second coil portion corresponding to the other side with regard to power transmission and reception is suppressed even when a gap changes.

BRIEF DESCRIPTION OF DRAWINGS

FIG. 5 is a side sectional view schematically illustrating a wireless power transfer system according to a second embodiment of this disclosure.

FIG. 6A and FIG. 6B are side sectional views illustrating other modes of the power reception coil device, respectively.

DESCRIPTION OF EMBODIMENTS

Figure 1:
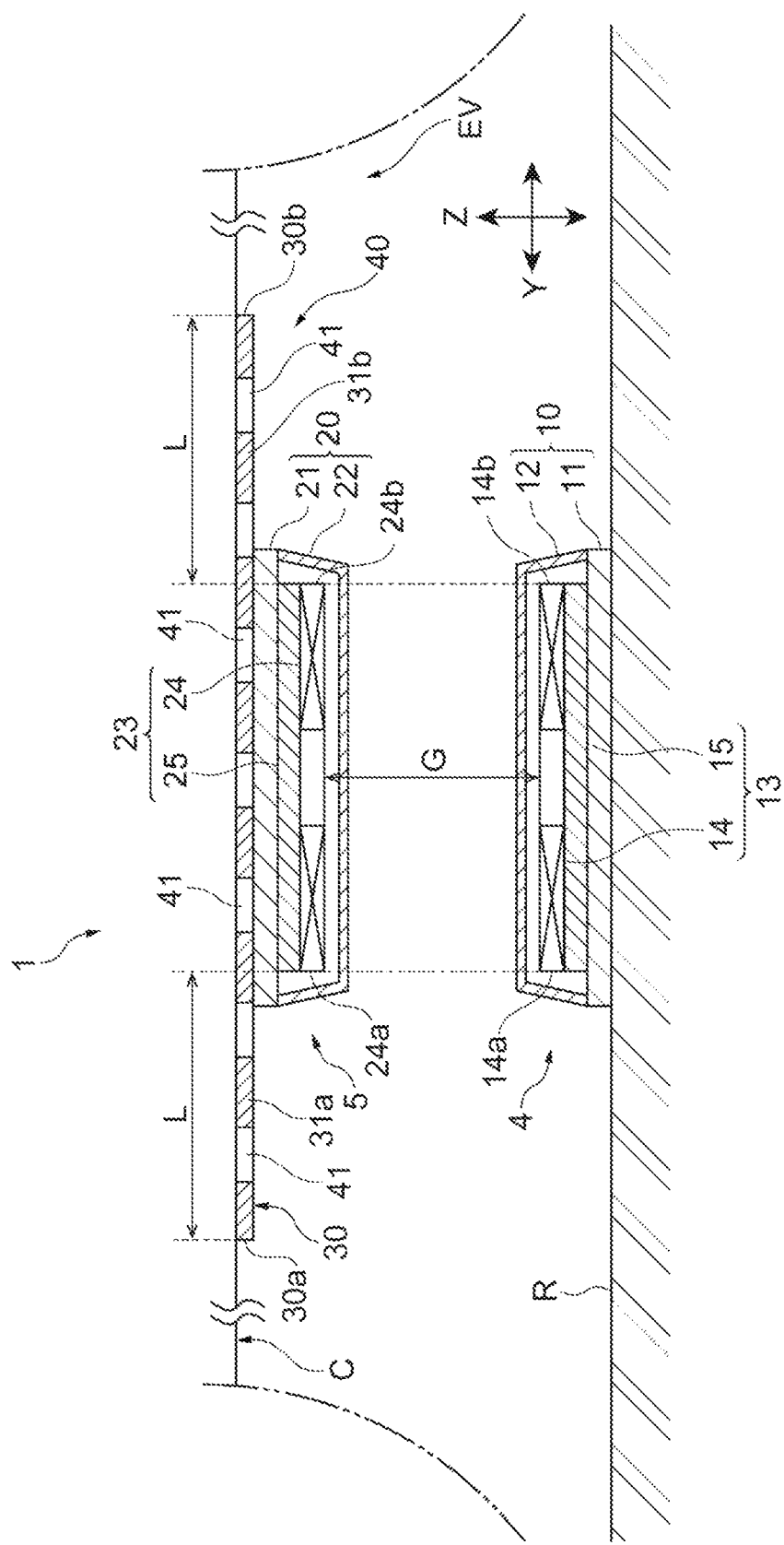
FIG. 1 is a side sectional view schematically illustrating a wireless power transfer system according to a first embodiment of this disclosure.

A coil device according to an aspect of this disclosure is a first coil device, which faces a second coil device in a first direction and wirelessly performs power transmission or power reception, including a first coil portion that faces a second coil portion of the second coil device in the first direction and includes a conductive wire, and at least one nonmagnetic member that includes a protrusion protruding to an outside of the first coil portion in a second direction orthogonal to the first direction, in which the nonmagnetic member includes an eddy current interrupter that interrupts a part of an eddy current generated in the nonmagnetic member.

When the nonmagnetic member includes the protrusion, magnetic flux generated by the second coil portion of the second coil device is likely to interlink with the protrusion. When a distance between the first coil portion and the second coil portion, that is, a gap decreases, a tendency of the magnetic flux to interlink with the protrusion increases. According to the first coil device according to the aspect of this disclosure, when the eddy current interrupter is provided in the nonmagnetic member, a part of the eddy current generated in the nonmagnetic member is interrupted and flows to detour around the eddy current interrupter. In this way, a distance of a flow of the eddy current increases, magnetic resistance increases, and the eddy current is reduced. Here, eddy current-dependent magnetic flux can cancel coil-dependent magnetic flux generated by the second coil portion. When the eddy current decreases as described above, the eddy current-dependent magnetic flux decreases, and a decrease in magnetic flux interlinking with the second coil portion (that is, magnetic flux generated from the second coil portion which returns to and interlinks with the second coil portion) is suppressed. According to such a coil device, a change in inductance of the second coil portion corresponding to the other side with regard to power transmission and reception is suppressed even when the gap changes.

In some aspects, the eddy current interrupter is provided in the protrusion. Magnetic flux from the second coil portion is likely to interlink with the protrusion. For this reason, an eddy current generated in the protrusion tends to increase. When the eddy current interrupter is provided in the protrusion, in the protrusion, a part of an eddy current is interrupted, and the eddy current flows to detour around the eddy current interrupter. The effect of reducing the eddy current-dependent magnetic flux is more remarkably exerted by the eddy current interrupter provided in the protrusion, and a decrease in inductance of the second coil portion is efficiently suppressed.

In some aspects, the first coil portion is smaller than the second coil portion in the second direction. When the first coil portion is smaller than the second coil portion, magnetic flux generated from the second coil portion is more likely to interlink with the nonmagnetic member when compared to a case in which the first coil portion is the same as or larger than the second coil portion. For this reason, providing the eddy current interrupter is significant.

In some aspects, the nonmagnetic member includes a hollow portion recessed to an opposite side from a side facing the second coil portion in the first direction, and the first coil portion is located in the hollow portion. When the first coil portion is located in the hollow portion, a part or a whole of the first coil portion is accommodated in the nonmagnetic member. Therefore, the first coil portion may be inhibited from protruding in the first direction.

In some aspects, the first coil portion and the second coil portion are circular type coils. When the circular type coils are used, a direction of magnetic flux is close to the first direction, and thus magnetic flux generated from the second coil portion is likely to interlink with the nonmagnetic member. For this reason, providing the eddy current interrupter is significant.

In some aspects, the eddy current interrupter is a hole penetrating the nonmagnetic member in the first direction or a concave portion recessed in the first direction. When the hole or the concave portion serving as the eddy current interrupter is provided in the nonmagnetic member, it is possible to reliably and easily interrupt a part of the eddy current and change a path of the eddy current in the nonmagnetic member.

In some aspects, the at least one nonmagnetic member includes a first nonmagnetic member and a second nonmagnetic member disposed adjacent to the first nonmagnetic member on a side away from the second coil portion when compared with the first nonmagnetic member, the eddy current interrupter includes a first hole provided in the first nonmagnetic member to penetrate the first nonmagnetic member in the first direction, and a second hole provided in the second nonmagnetic member to penetrate the second nonmagnetic member in the first direction, the first coil device further includes a moving mechanism that moves the second nonmagnetic member in the second direction, and the moving mechanism moves the second nonmagnetic member such that overlapping between the first hole and the second hole decreases as a distance between the first coil portion and the second coil portion decreases. In this case, an overlapping state of the eddy current interrupter may be changed by adjusting a position of the first nonmagnetic member and/or the second nonmagnetic member. In this way, the path of the eddy current changes. When the first coil portion and the second coil portion are separated from each other to some extent, magnetic flux from the second coil portion rarely interlinks with the nonmagnetic member. For this reason, an overlapping state between the first hole which is the eddy current interrupter of the first nonmagnetic member and the second hole which is the eddy current interrupter of the second nonmagnetic member is decreased, and a penetration part as a whole of the plurality of nonmagnetic members is decreased. In this way, a function of preventing magnetic flux from leaking to the surrounding (that is, a shielding function) is ensured. Here, the nonmagnetic member originally has this function. When the first coil portion and the second coil portion approach each other, an influence of the eddy current increases. The overlapping state between the first hole which is the eddy current interrupter of the first nonmagnetic member and the second hole which is the eddy current interrupter of the second nonmagnetic member is increased, and the penetration part as a whole of the plurality of nonmagnetic members is increased. In this way, a function of blocking an eddy current is exerted.

In some aspects, the at least one nonmagnetic member includes a first nonmagnetic member and a second nonmagnetic member disposed adjacent to the first nonmagnetic member on a side away from the second coil portion when compared with the first nonmagnetic member, the eddy current interrupter includes a hole provided in any one of the first nonmagnetic member and the second nonmagnetic member to penetrate the one nonmagnetic member in the first direction, and a convex portion provided on the other one of the first nonmagnetic member and the second nonmagnetic member to fit to the hole, the first coil device further includes a moving mechanism that moves the second nonmagnetic member in the first direction, and the moving mechanism moves the second nonmagnetic member such that overlapping between the hole and the convex portion decreases as a distance between the first coil portion and the second coil portion decreases. When the first coil portion and the second coil portion are separated from each other to some extent, magnetic flux from the second coil portion rarely interlinks with the nonmagnetic member. For this reason, the hole and the convex portion are fit to each other using the moving mechanism to reduce overlapping thereof, thereby decreasing a gap (a space in which the hole is left).

In this way, a function of preventing magnetic flux from leaking to the surrounding is ensured. Here, the nonmagnetic member originally has this function. When the first coil portion and the second coil portion approach each other, an influence of the eddy current increases. The gap increases when a fit degree between the hole and the convex portion is loosened using the moving mechanism. In this way, a function of blocking an eddy current is exerted.

In some aspects, the first coil device further includes an electrically conductive sheet member provided between the first nonmagnetic member and the second nonmagnetic member and allowed to come into close contact with the first nonmagnetic member and the second nonmagnetic member. It is possible to ensure electric connection between the first nonmagnetic member and the second nonmagnetic member by providing the sheet member that can come into close contact with an uneven shape of the first nonmagnetic member and the second nonmagnetic member.

Hereinafter, embodiments of this disclosure will be described with reference to drawings. In description of the drawings, the same reference numeral will be assigned to the same element, and a repeated description will be omitted. In addition, the respective drawings are prepared for description, and illustrated to particularly emphasize a part to be described. For this reason, a ratio of dimensions of respective members in the drawings may not be the same as an actual ratio. In description below, a left-right direction X, a front-rear direction Y, and a vertical direction Z refer to directions based on an electric vehicle EV.

A description will be given of a wireless power transfer system 1 of the present embodiment and a power reception coil device (first coil device) 5 applied thereto with reference to FIG. 1. The wireless power transfer system 1 includes a power transmission coil device (second coil device) 4 and the power reception coil device 5, and is a system for wirelessly supplying power from the power transmission coil device 4 to the power reception coil device 5. The power transmission coil device 4 and the power reception coil device 5 are separated from each other in the vertical direction Z (first direction). For example, the power transmission coil device 4 is installed on a road surface R of a parking lot, etc. For example, the power reception coil device 5 is mounted in the electric vehicle (movable object) EV. The wireless power transfer system 1 is configured to supply power to the electric vehicle EV arriving at the parking lot, etc. using magnetic coupling between coils of a magnetic resonance scheme, an electromagnetic induction scheme, etc.

The power transmission coil device 4 is provided to protrude upward from the road surface R. For example, the power transmission coil device 4 has a shape of a flat frustum or a rectangular parallelepiped. A controller, an inverter, etc. (not illustrated) is connected to the power transmission coil device 4. Desired AC power generated by a DC power source or an AC power source is sent to the power transmission coil device 4. When the AC power is sent to the power transmission coil device 4, the power transmission coil device 4 generates magnetic flux. The power transmission coil device 4 may be buried in the road surface R rather than protruding from the road surface R.

The power transmission coil device 4 includes a flat plate-shaped power transmission coil portion (second coil portion) 13 that generates magnetic flux, and a housing 10 that accommodates the power transmission coil portion 13. For example, the housing 10, which is flat, includes a base 11 fixed to the road surface R and a protective cover 12 fixed to the base 11 to form an accommodation space between the protective cover 12 and the base 11. For example, the base 11 and the protective cover 12 are made of resin. Alternatively, the base 11 not facing the power reception coil device 5 may be embodied using a nonmagnetic and electrically conductive material (for example, aluminum).

For example, the power transmission coil portion 13 is a circular type coil. The power transmission coil portion 13 includes a ferrite plate 15 which is a rectangular plate-shaped magnetic member and a spirally wound conductive wire 14 fixed on the ferrite plate 15. For example, the conductive wire 14 is a litz wire and is wound in a rectangular shape or a circular shape. The ferrite plate 15 is disposed on a rear surface side of the conductive wire 14. In the left-right direction X and the front-rear direction Y (each of which corresponds to a direction orthogonal to the first direction, that is, a second direction), the ferrite plate 15 may have the same size as the spirally wound conductive wire 14 or may be smaller than the conductive wire 14.

The power reception coil device 5 is attached to a bottom surface of a vehicle body (ion chassis C, etc.) of the electric vehicle EV, and faces the power transmission coil device 4 in the vertical direction Z. A direction (first direction) in which the power reception coil device 5 faces the power transmission coil device 4 refers to a direction perpendicular to the road surface R on which the power transmission coil device 4 is provided from the power reception coil device 5. When the power transmission coil device 4 and the power reception coil device 5 are misaligned, the direction in which the power reception coil device 5 faces the power transmission coil device 4 is the direction perpendicular to the road surface R, not a direction directed from the power reception coil device 5 to the power transmission coil device 4 to be oblique with respect to the road surface R.

For example, the power reception coil device 5 has a shape of a flat frustum or a rectangular parallelepiped. A controller, a rectifier, etc. (not illustrated) is connected to the power reception coil device 5. The power reception coil device 5 generates an induced current when the magnetic flux generated by the power transmission coil device 4 interlinks with the power reception coil device 5. In this way, the power reception coil device 5 wirelessly receives power from the power transmission coil device 4. The power received by the power reception coil device 5 is supplied to a load (for example, a battery).

The power reception coil device 5 includes a flat plate-shaped power reception coil portion (first coil portion) 23 that generates an induced current and a housing 20 that accommodates the power reception coil portion 23. For example, the flat housing 20 includes a base 21 fixed to the vehicle body of the electric vehicle EV and a protective cover 22 fixed to the base 21 to form an accommodation space between the protective cover 22 and the base 21. For example, the base 21 and the protective cover 22 are made of resin. Alternatively, the base 21 not facing the power transmission coil device 4 may be embodied using a nonmagnetic and electrically conductive material (for example, aluminum).

For example, the power reception coil portion 23 is a circular type coil. The power reception coil portion 23 includes a ferrite plate 25 which is a rectangular plate-shaped magnetic member and a spirally wound conductive wire 24 fixed on the ferrite plate 25. For example, the conductive wire 24 is a litz wire and is wound in a rectangular shape or a circular shape. The ferrite plate 25 is disposed on a rear surface side of the conductive wire 24. In the left-right direction X and the front-rear direction Y (each of which corresponds to the direction orthogonal to the first direction, that is, the second direction), the ferrite plate 25 may have the same size as the spirally wound conductive wire 24. The ferrite plate 25 may be smaller than the conductive wire 24 or larger than the conductive wire 24.

In the wireless power transfer system 1, a shape and a size of the power transmission coil portion 13 are equal to a shape and a size of the power reception coil portion 23. A common coil device may be used as the power transmission coil device 4 and the power reception coil device 5. When a center of the power reception coil device 5 in the front-rear direction Y is aligned with a center of the power transmission coil device 4 in the front-rear direction Y, positions of both ends of the power transmission coil portion 13, that is, a front end 14a and a rear end 14b of the conductive wire 14 in the front-rear direction Y match positions of a front end 24a and a rear end 24b of the conductive wire 24 in the front-rear direction Y.

Further, a gap G corresponding to an interval in the vertical direction Z is formed between a surface of the power transmission coil portion 13 of the power transmission coil device 4 (that is, an upper surface of the conductive wire 14) and a surface of the power reception coil portion 23 of the power reception coil device 5 (that is, a lower surface of the conductive wire 24). This gap G is a minimum distance between the power transmission coil portion 13 and the power reception coil portion 23. When the movable object is the electric vehicle EV, the gap G may vary according to a model, an automobile rank, etc. of the electric vehicle EV.

The power reception coil device 5 includes one shield plate (nonmagnetic member) 30 disposed between the vehicle body (ion chassis C, etc.) of the electric vehicle EV and the power reception coil portion 23. The shield plate 30 is a nonmagnetic and electrically conductive member, and is made of, for example, aluminum or copper. The shield plate 30 is disposed on an opposite side of the power reception coil portion 23 from a side facing the power transmission coil portion 13 of the power transmission coil device 4. In other words, the shield plate 30 is provided between the base 21 of housing 20 and the chassis C made of iron (that is, on a rear surface side of the power reception coil portion 23). The shield plate 30 may include one plate material or a combination of a plurality of plate materials.

Figure 2:
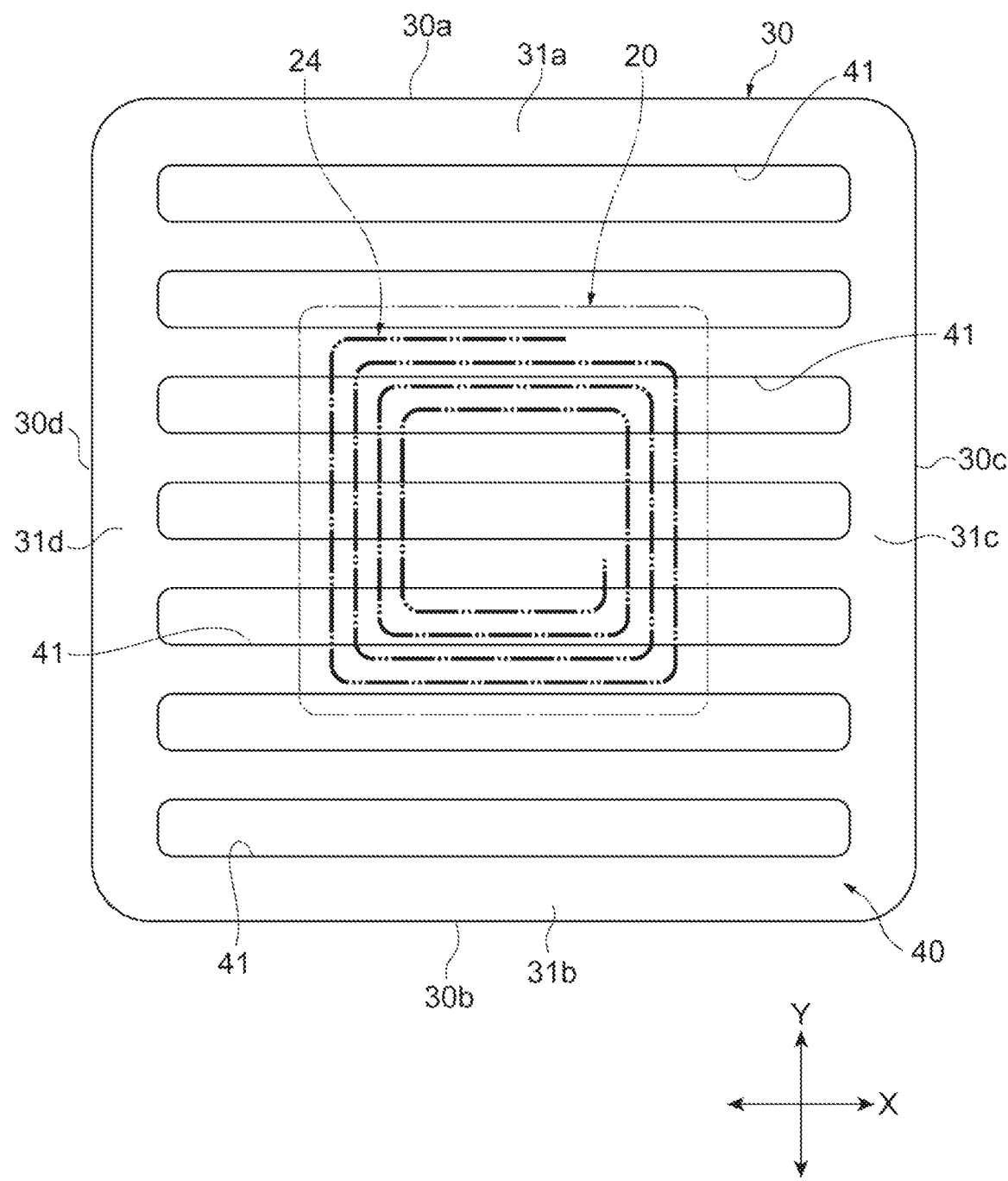
FIG. 2 is a plan view illustrating a power reception coil device of FIG. 1.

As illustrated in FIG. 1 and FIG. 2, in the left-right direction X and the front-rear direction Y (each of which corresponds to the second direction orthogonal to the first direction), the shield plate 30 protrudes to the outside of a rectangular region in which the power reception coil portion 23 is provided. In other words, the shield plate 30 protrudes outward from an outer periphery of the power reception coil portion 23 over the entire circumference. In other words, the shield plate 30 includes protrusions 31a, 31b, 31c, and 31d (whole circumferential protrusion) protruding over the entire circumference. In this way, when the power reception coil portion 23 is projected in the vertical direction Z, the shield plate 30 covers a projection region. An area of the shield plate 30 is wider than a projected area of the power reception coil portion 23 in the vertical direction Z.

The shield plate 30 is a shield member provided to prevent the magnetic flux generated by the power transmission coil device 4 from leaking to the electric vehicle EV side. It is considered that the magnetic flux generated by the power transmission coil device 4 is likely to leak to the electric vehicle EV side since the power reception coil device 5 is close to the iron chassis C. However, leakage of the magnetic flux may be prevented by providing the shield plate 30. In the shield plate 30 of the present embodiment, the possibility of misalignment of the power reception coil device 5 with respect to the power transmission coil device 4 is taken into consideration. The shield plate 30 can prevent the magnetic flux generated by the power transmission coil device 4 from leaking to the electric vehicle EV side when the misalignment of the power reception coil device 5 with respect to the power transmission coil device 4 occurs. In addition, since the magnetic flux from the power transmission coil device 4 bulges outward from the power transmission coil device 4, the shield plate 30 may prevent the magnetic flux generated by the power transmission coil device 4 from leaking to the electric vehicle EV side not only when the misalignment occurs but also when no misalignment occurs.

In the front-rear direction Y, the shield plate 30 protrudes from a front end of the power reception coil portion 23, that is, the front end 24a of the conductive wire 24 corresponding to the front end of the power reception coil portion 23. In other words, the shield plate 30 includes the protrusion 31a protruding to the outside of a front end of the projection region of the power reception coil portion 23. For example, a length L of the protrusion 31a (a distance from the front end 24a to a front end 30a) may be greater than or equal to a sum of the gap G and a maximum permissible misalignment amount allowable between the power reception coil portion 23 of the power reception coil device 5 and the power transmission coil portion 13 of the power transmission coil device 4. The length L of the protrusion 31a may be less than the sum of the maximum permissible misalignment amount and the gap G.

In the front-rear direction Y, the shield plate 30 protrudes from a rear end of the power reception coil portion 23, that is, the rear end 24b of the conductive wire 24 corresponding to the rear end of the power reception coil portion 23. In other words, the shield plate 30 includes the protrusion 31b protruding to the outside of a rear end of the projection region of the power reception coil portion 23. A length L of the protrusion 31b (a distance from the rear end 24b to a rear end 30b) may be greater than or equal to the sum of the maximum permissible misalignment amount and the gap G. The length L of the protrusion 31b may be less than the sum of the maximum permissible misalignment amount and the gap G.

As illustrated in FIG. 2, in the left-right direction X, the protruding length of the shield plate 30 is set in the same manner as described above. That is, the shield plate 30 includes the protrusion 31c protruding to the outside of a right end of the projection region of the power reception coil portion 23. The shield plate 30 includes a protrusion 31d protruding to the outside of a left end of the projection region of the power reception coil portion 23. Each of lengths L of the protrusions 31c and 31d (a distance from a right end of the conductive wire 24 to a right end 30c and a distance from a left end of the conductive wire 24 to a right end 30d) may be greater than or equal to the sum of the maximum permissible misalignment amount and the gap G. Each of lengths L of the protrusions 31c and 31d may be less than the sum of the maximum permissible misalignment amount and the gap G.

For example, the maximum permissible misalignment amount is a maximum value in a range of a misalignment amount determined in advance to be able to satisfy predetermined power efficiency. Specifically, a misalignment is changed to measure power efficiency in advance, and the maximum permissible misalignment amount is set to a maximum value in a range of a misalignment amount in which power efficiency of a certain level or more is obtained. As another example of the maximum permissible misalignment amount, for example, the maximum permissible misalignment amount may be set to a maximum value in a range of a misalignment amount in which a decrease in power efficiency with respect to maximum power efficiency is less than or equal to 5% or 10%. The power efficiency refers to a ratio of power at a certain place inside a power receiver including the power reception coil device 5 to power at a certain place inside a power transmitter including the power transmission coil device 4. For example, power efficiency corresponds to a ratio of power of an output of the rectifier of the power receiver to power of an input of the inverter of the power transmitter. Herein, the inverter of the power transmitter generates desired AC power, which is transmitted from the power transmission coil device 4 to the power reception coil device 5, from DC power (an output from the DC power source, power obtained by rectifying an output from the AC power source, etc.). The rectifier of the power receiver converts the AC power received by the power reception coil device 5 into DC power (for example, power input to the battery).

Alternatively, the maximum permissible misalignment amount may be defined as a maximum value in a range of a misalignment amount in which the power receiver including the power reception coil device 5 may supply predetermined power (for example, 3 kW) to a load connected to the power receiver rather than a maximum value in a range of a misalignment amount determined to be able to satisfy the predetermined power efficiency.

Further, another example of the maximum permissible misalignment amount is a misalignment amount descried in a specification, a usage manual, etc. of the wireless power transfer system 1 in terms of a usage mode of the wireless power transfer system 1 determined in advance. Even though the maximum permissible misalignment amount may vary according to a model, an automobile rank, etc. of the electric vehicle EV, examples thereof include a numerical value of 100 mm in the front-rear direction Y and 200 mm in the left-right direction X. In this case, the usage manual may state that "Please use the wireless power transfer system such that the misalignment falls within a range of 100 mm in the front-rear direction Y and 200 mm in the left-right direction X".

When the misalignment is not present, this case may mean a positional relation between the power transmission coil device 4 and the power reception coil device 5 in which maximum power efficiency of the present wireless power transfer system 1 is implemented. Alternatively, when the misalignment is not generated, this case may mean that a center of a surface of the power transmission coil portion 13 in the front-rear direction Y and a center of a surface of the power reception coil portion 23 in the front-rear direction Y match each other in the vertical direction Z. Alternatively, when the misalignment is not generated, this case may mean a positional relation between the power transmission coil device 4 and the power reception coil device 5 defined as no misalignment in the specification, the usage manual, etc. of the wireless power transfer system 1. A shift from these reference positions indicating no misalignment is set as a misalignment.

Different numerical values may be set in the front-rear direction Y and the left-right direction X as the maximum permissible misalignment amount. In a movable object such as the electric vehicle EV which runs in the front-rear direction Y, the maximum permissible misalignment amount in the front-rear direction Y may be determined to be smaller than the maximum permissible misalignment amount in the left-right direction X.

According to the power reception coil device 5 including the protruding shield plate 30, even when an alignment corresponding to the maximum permissible misalignment amount occurs in the front-rear direction Y, the shield plate 30 directly faces the power transmission coil device 4. Therefore, even when the power reception coil portion 23 does not fully directly face the power transmission coil portion 13 due to occurrence of an misalignment of the power reception coil device 5 in the front-rear direction Y, magnetic flux from the power transmission coil portion 13 is inhibited from leaking to the electric vehicle EV by shielding effect of the shield plate 30. As a result, the magnetic flux from the power transmission coil portion 13 easily passes through the power reception coil portion 23, and a decrease in power efficiency is suppressed.

The shield plate 30 exerts shielding effect not only when a misalignment occurs, but also when the gap G changes. Moreover, the shield plate 30 of the present embodiment is configured to suppress a change in inductance of the power transmission coil portion 13 in the power transmission coil device 4 corresponding to the other side with regard to power transmission and reception even when the gap G changes. Hereinafter, a description will be given of a configuration that can suppress the change in inductance of the power transmission coil portion 13.

As illustrated in FIG. 1, and FIG. 2, the shield plate 30 includes an eddy current interrupter 40 that changes a state of an eddy current that may be generated in the shield plate 30. The eddy current interrupter 40 interrupts a part of the eddy current generated in the shield plate 30 and causes the part of the eddy current to detour, thereby changing the state of the eddy current. For example, eddy current interrupter 40 includes a plurality of holes 41 penetrating front and rear surfaces of the shield plate 30. That is, the holes 41 penetrate the shield plate 30 in the direction (the first direction) in which the power transmission coil device 4 faces the power reception coil device 5.

The eddy current interrupter 40 will be described in more detail. The plurality of holes 41 are formed in the shield plate 30. For example, each of the holes 41 is an elongated hole (slit) and extends in one direction. For example, the plurality of holes 41 has substantially the same length, is parallel to each other, and is arranged at approximately equal intervals. Each of the holes 41 extends up to positions close to the both ends of the shield plate 30 (from the right end 30*c* to the left end 30*d*) in the left-right direction X. Each of the holes 41 extends longer than the power reception coil portion 23 (conductive wire 24). The plurality of holes 41 is provided across the projection region obtained by projecting the power reception coil portion 23 in the vertical direction Z and the protrusions 31*a* to 31*d* protruding from the projection region. In other words, the eddy current interrupter 40 is provided in the above-mentioned projection region and in the protrusions 31*a* to 31*d* as well.

Various shapes may be adopted for the holes 41 of the eddy current interrupter 40 when a part of the eddy current generated in the shield plate 30 may be interrupted and caused to detour, and the state of the eddy current may be changed when compared to a case in which a slit 40*a* is not present. The holes 41 may extend long in the left-right direction X as illustrated in FIG. 2, and may extend long in another direction, for example, the front-rear direction Y. For example, the holes 41 may not be formed parallel to each other, and may be formed in a cross shape extending in the left-right direction X and the front-rear direction Y, or formed to radially extend from a center position of the conductive wire 24. The holes 41 may not be continuously provided across the projection region and the protrusions 31a to 31d, and may be separately provided in each of the projection region and the protrusions 31a to 31d. The holes 41 may not be provided in the projection region, and may be provided only in the protrusions 31a to 31d. In this way, it is possible to ensure strength of the shield plate 30 when compared to a case in which the holes 41 are provided in the projection region while interrupting the eddy current generated in the shield plate 30. A width or a length of each of the holes 41 may be appropriately changed according to a position at which each of the holes 41 is provided.

Figure 3:
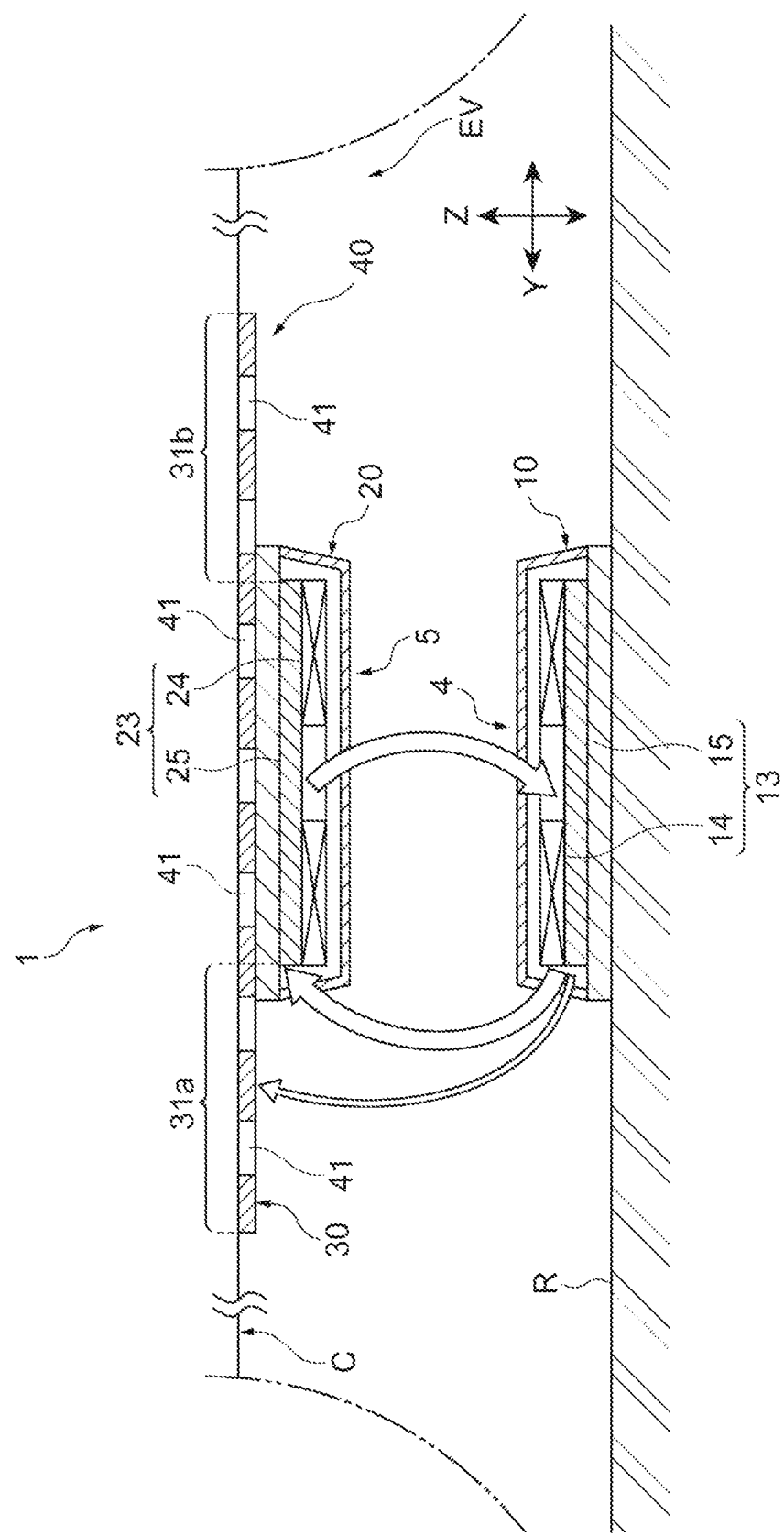
FIG. 3 is a diagram for description of magnetic flux generated in the wireless power transfer system of FIG. 1.

Next, a description will be given of effects of the shield plate 30 and the eddy current interrupter 40 included in the power reception coil device 5. When the shield plate 30, which is a nonmagnetic member, includes the protrusions 31a to 31d, the magnetic flux generated by the power transmission coil portion 13 of the power transmission coil device 4 is likely to interlink with the protrusions 31a to 31d. When the distance between the power reception coil portion 23 and the power transmission coil portion 13, that is, the gap G decreases, a tendency of the magnetic flux to interlink with the protrusions 31a to 31d increases. According to the power reception coil device 5 of the present embodiment, when the eddy current interrupter 40 is provided in the shield plate 30, a part of the eddy current generated in the shield plate 30 is interrupted and flows to detour around the eddy current interrupter 40. In this way, a distance of a flow of the eddy current increases, magnetic resistance increases, and the eddy current is reduced. Eddy current-dependent magnetic flux can cancel coil-dependent magnetic flux generated by the power transmission coil portion 13. However, when the eddy current decreases as described above, the eddy current-dependent magnetic flux decreases, and a decrease in magnetic flux interlinking with the power transmission coil portion 13 (that is, magnetic flux generated from the power transmission coil portion 13 which returns to and interlinks with the power transmission coil portion 13, so-called self-return) is suppressed (see FIG. 3). According to the power reception coil device 5, a change in inductance of the power transmission coil portion 13 corresponding to the other side with regard to power transmission and reception is suppressed even when the gap G changes.

Figure 4:
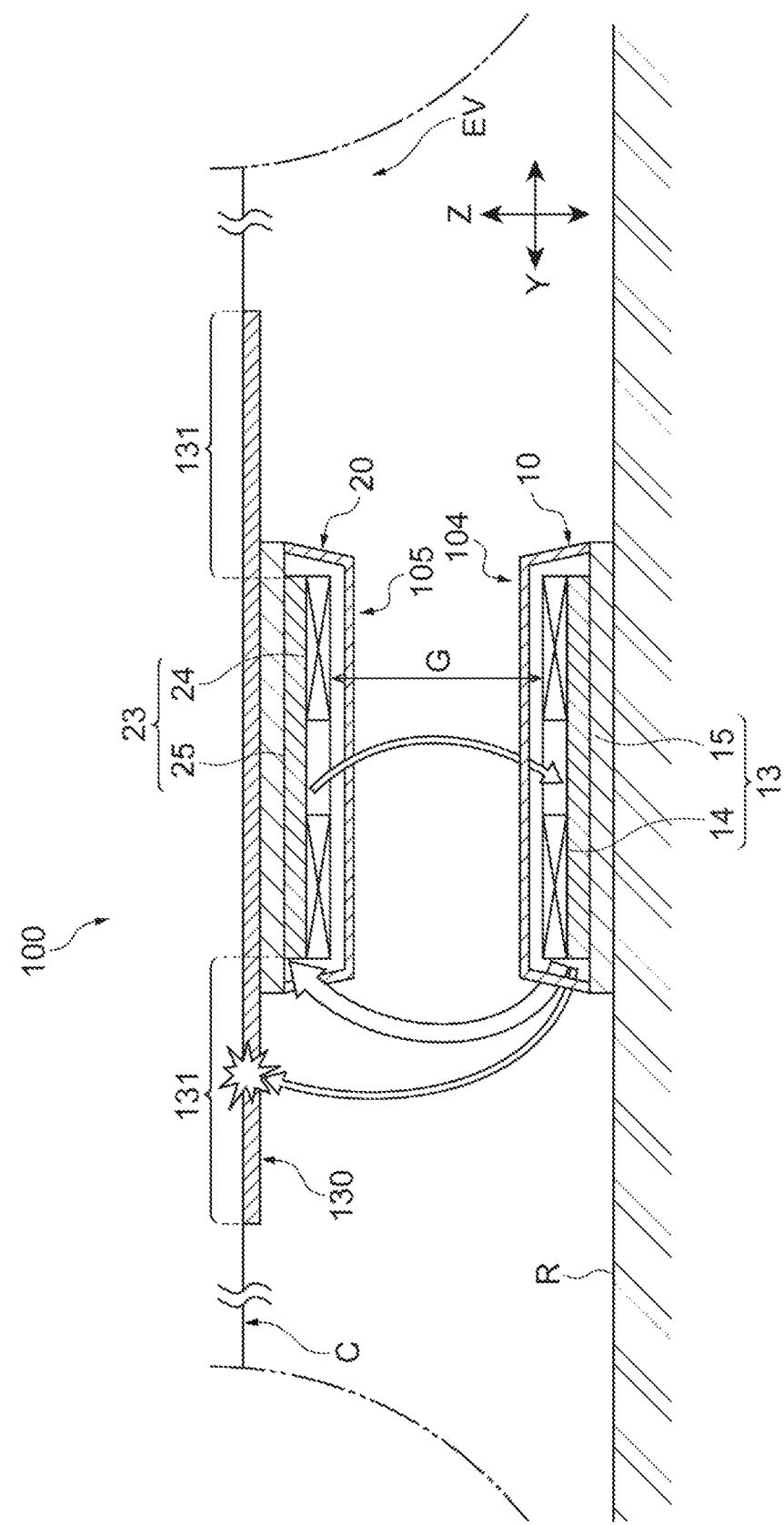
FIG. 4 is a diagram for description of magnetic flux generated in a wireless power transfer system according to a comparative example.

As illustrated in FIG. 4, it is possible to consider a wireless power transfer system 100 including a shield plate 130 which has a protrusion 131 and is not provided with an eddy current interrupter in the shield plate 130. Magnetic flux generated by a power transmission coil portion 13 interlinks with the protrusion 131. In particular, when a gap G between the power transmission coil portion 13 of a power transmission coil device 104 and a power reception coil portion 23 of a power reception coil device 105 becomes small, interlinkage of the magnetic flux is likely to occur. Further, when eddy current-dependent magnetic flux is generated in the shield plate 130, this magnetic flux cancels magnetic flux from the power transmission coil portion 13. As a result, magnetic flux returning to the power transmission coil portion 13 (self-returning magnetic flux) decreases, and inductance of the power transmission coil portion 13 decreases. According to the shield plate 130 in which the eddy current interrupter 40 is provided, a decrease in inductance of the power transmission coil portion 13 is suppressed even when the gap G changes.

In addition, magnetic flux from the power transmission coil portion 13 is likely to interlink with the protrusions 31a to 31d. For this reason, eddy currents generated in the protrusions 31a to 31d tend to increase. In the power reception coil device 5, the eddy current interrupter 40 is provided in the protrusions 31a to 31d. In this way, in the protrusions 31a to 31d, a part of an eddy current is interrupted, and the eddy current flows to detour around the eddy current interrupter 40. The effect of reducing the eddy current-dependent magnetic flux is more remarkably exerted by the eddy current interrupter 40 provided in the protrusions 31a to 31d. A decrease in inductance of the power transmission coil portion 13 is efficiently suppressed.

Since the power transmission coil portion 13 and the power reception coil portion 23 are circular type coils, a direction of magnetic flux is close to the vertical direction Z. Therefore, the magnetic flux from the power transmission coil portion 13 is likely to interlink with the shield plate 30. On the other hand, when the coil portions are of solenoid type, a direction of magnetic flux is close to the left-right direction X or the front-rear direction Y. For this reason, it is considered that the magnetic flux from the power transmission coil portion 13 rarely interlinks with the shield plate. In this regard, the eddy current interrupter 40 provided to the circular type power reception coil portion 23 is particularly meaningful and effective.

When the holes 41 serving as the eddy current interrupter 40 are provided in the shield plate 30, it is possible to reliably and easily interrupt a part of the eddy current and change a path of the eddy current in the shield plate 30. Since the eddy current interrupter 40 includes the holes 41 which are through-holes, air passes through the inside of the shield plate 30 and a temperature rise of the shield plate 30 is suppressed.

A description will be given of a wireless power transfer system 1A according to a second embodiment with reference to FIG. 5. The wireless power transfer system 1A is different from the wireless power transfer system 1 of the first embodiment in that a power transmission coil device 4A larger than the power reception coil device 5 is provided instead of the power transmission coil device 4 having the same shape and the same size as those of the power reception coil device 5. The power transmission coil device 4A includes a power transmission coil portion 13A having a conductive wire 14A and a ferrite plate 15A. In the front-rear direction Y and the left-right direction X, the power transmission coil portion 13A of the power transmission coil device 4A is larger than the power reception coil portion 23 of the power reception coil device 5. A housing 10 of the power transmission coil device 4A is larger than the housing 20 of the power reception coil device 5. In other words, the power reception coil portion 23 of the power reception coil device 5 (the size of the conductive wire 24 in the case of a circular type) is smaller than the power transmission coil portion 13A of the power transmission coil device 4A (the size of the conductive wire 14A in the case of a circular type).

A shield plate 30A may be larger than the shield plate 30 of the power reception coil device 5 of the first embodiment or may have the same size as that of the shield plate 30. The shield plate 30A includes protrusions 31a to 31d. The shield plate 30A protrudes to the outside of a region in which the power transmission coil portion 13A of the power transmission coil device 4A is projected in the vertical direction Z. An eddy current interrupter 40A including a plurality of holes 41 is provided in the shield plate 30A. The eddy current interrupter 40A may be the same as the eddy current interrupter 40 of the first embodiment. In the eddy current interrupter 40A, the number of holes 41 or a total size of the holes 41 may be larger than that of the eddy current interrupter 40.

The same effect as that of the wireless power transfer system 1 of the first embodiment is exhibited by the wireless power transfer system 1A including the power transmission coil device 4A and the power reception coil device 5A. In addition, when the power reception coil portion 23 is smaller than the power transmission coil portion 13A, magnetic flux generated from the power transmission coil portion 13A is likely to interlink with the shield plate 30A. For this reason, in the wireless power transfer system 1A, the significance of providing the eddy current interrupter 40A is more remarkable.

Modifications below may be adopted as modifications of the power reception coil devices in the first embodiment and the second embodiment. For example, as illustrated in FIG. 6A, it is possible to adopt a structure in which a power reception coil device 5B is embedded in a rectangular parallelepiped-shaped depression formed in the chassis C of the electric vehicle EV. In this case, a shield plate 30B of an eddy current interrupter 40B includes a hollow portion 33 fit to the depression of the chassis C. The hollow portion 33 is recessed to an opposite side from a side facing the power transmission coil portion 13 in the vertical direction Z. A power reception coil portion 23 is located in the hollow portion 33. Further, the shield plate 30B includes protrusions 31a to 31d protruding in the front-rear direction Y and the left-right direction X in a portion other than the depression of the chassis C (the protrusions 31c and 31d are the same as those illustrated in FIG. 2). A lower surface 22a of a housing 20 may be flush with lower surfaces 31f of the protrusions 31a to 31d or positioned on the hollow portion 33 side of the lower surfaces 31f. The power reception coil device 5B is located at a higher position than a minimum ground clearance of the electric vehicle EV.

The eddy current interrupter 40B includes a plurality of holes 41. For example, the holes 41 are formed on a rear surface side of the power reception coil portion 23, and the holes 41 are further formed in the protrusions 31a to 31d. The holes 41 may be formed or may not be formed in a side wall 32 extending along the vertical direction Z.

According to the power reception coil device 5B, the same effects as those of the power reception coil devices 5 and 5A and the wireless power transfer systems 1 and 1A of the above embodiments are exhibited. In addition, when the power reception coil portion 23 is located in the hollow portion 33, a part or a whole of the power reception coil portion 23 is accommodated in the shield plate 30B. Therefore, the power reception coil portion 23 is inhibited from protruding downward.

Furthermore, the eddy current interrupter 40B is provided in the protrusions 31a to 31d extending in a flange shape. In the shield plate 30B having a shape including the hollow portion 33, magnetic flux from the power transmission coil portion 13 is likely to particularly interlink with the protrusions 31a to 31d. For this reason, the eddy current interrupter 40B provided in the protrusions 31a to 31d is particularly effective from a viewpoint of decreasing an eddy current reducing eddy current-dependent magnetic flux. Alternatively, the eddy current interrupter 40B may be provided only in the protrusions 31a to 31d. In this way, it is possible to ensure strength of the shield plate 30B when compared to a case in which the holes 41 are provided in the hollow portion 33 while interrupting the eddy current generated in the shield plate 30B. For example, the hollow portion 33 may be recessed in a shape of a truncated square pyramid.

Alternatively, as illustrated in FIG. 6B, a part of a hollow portion 33 may be disconnected, and a shield plate 30C including a discontinuous portion 34 may be used. An eddy current interrupter 40C including the shield plate 30C is similar to the eddy current interrupter 40B except for the above point. The same effect as that of the power reception coil device 5B including the eddy current interrupter 40B may be exhibited by a power reception coil device 5C including the eddy current interrupter 40C. Since the discontinuous portion 34 is provided, a shielding function of the shield plate 30C slightly deteriorates. However, the shield plate 30C is advantageous in terms of processability and ease of installation.

Figure 7:
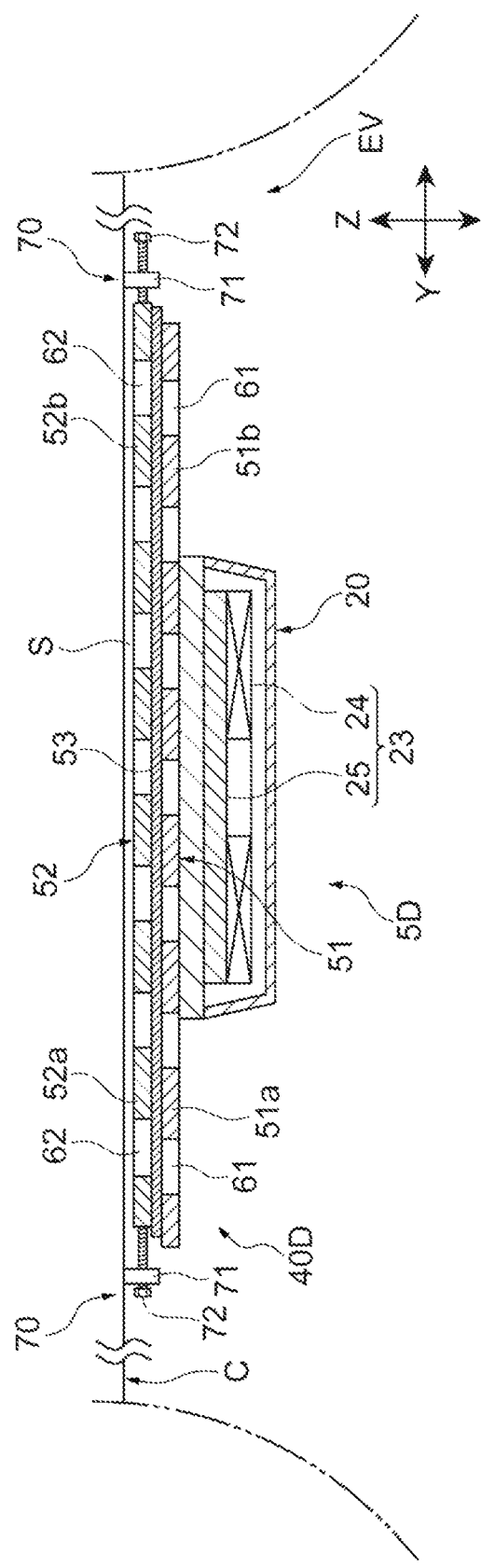
FIG. 7 is a side sectional view schematically illustrating a wireless power transfer system according to a third embodiment of this disclosure.

A description will be given of a power reception coil device 5D according to a third embodiment with reference to FIG. 7. The power reception coil device 5D is different from the power reception coil devices 5 and 5A to 5C of the above embodiments in that a first shield plate (first nonmagnetic member) 51 and a second shield plate (second nonmagnetic member) 52 which are a plurality of nonmagnetic members are included, and a moving mechanism 70 for relatively moving the second shield plate 52 with respect to the first shield plate 51 is included. An eddy current interrupter 40D including a hole (first hole) 61 and a hole (second hole) 62 is provided in the first shield plate 51 and the second shield plate 52. A sheet member 53 is provided between the first shield plate 51 and the second shield plate 52.

The second shield plate 52 is disposed adjacent to the first shield plate 51 on a side away from the power transmission coil portion 13 when compared with the first shield plate 51. For example, the first shield plate 51 is attached to the chassis C of the electric vehicle EV so as to be suspended by a mounting member (not illustrated). The second shield plate 52 and the sheet member 53 are disposed between the first shield plate 51 and the chassis C. A slight space S may be formed between the second shield plate 52 and the chassis C.

Moving mechanisms 70 and 70 are provided at both ends of the second shield plate 52. The moving mechanism 70 includes a fixed portion 71 fixed to the chassis C and a moving portion 72 movable in the front-rear direction Y with respect to the fixed portion 71. For example, the fixed portion 71 is made of a nonmagnetic material. For example, the moving portion 72 is made of a screw member such as a bolt. For example, the moving portion 72 is made of a nonmagnetic material. The second shield plate 52 may be moved in the front-rear direction Y by rotating the moving portion 72. A configuration of the moving mechanism is not limited to a mode in which the screw member is used.

A plurality of parallel holes 61 and 62 is formed in the first shield plate 51 and the second shield plate 52, respectively. The holes 61 formed in the first shield plate 51 and the holes 62 formed in the second shield plate 52 are formed in the same pattern. More specifically, the holes 61 and the holes 62 are equal in size, shape, and number. The first shield plate 51 includes protrusions 51a and 51b. The second shield plate 52 includes protrusions 52a and 52b. Although not illustrated, the first shield plate 51 and the second shield plate 52 may include protrusions protruding in the left-right direction X as illustrated in FIG. 2. The holes 61 of the first shield plate 51 are provided across a projection region obtained by projecting a power reception coil portion 23 in the vertical direction Z and the protrusions 51a and 51b. The holes 62 of the second shield plate 52 are provided across the projection region obtained by projecting the power reception coil portion 23 in the vertical direction Z and the protrusions 52a and 52b.

The sheet member 53 may be made of an electrically non-conductive material or an electrically conductive material. When the sheet member 53 is the electrically non-conductive material, magnetic flux enters the second shield plate 52 through the holes 61 of the first shield plate 51 and the sheet member 53. The amount of magnetic flux entering the second shield plate 52 changes due to a difference in area of the second shield plate 52 overlapping the holes 61 of the first shield plate 51, and thus a magnitude of an eddy current generated in the second shield plate 52 changes.

The sheet member 53 may not be provided between the first shield plate 51 and the second shield plate 52, and the first shield plate 51 and the second shield plate 52 may be in direct contact with each other.

In addition, when the sheet member 53 is electrically conductive, the same effect as that in the case in which the first shield plate 51 and the second shield plate 52 are in direct contact with each other is obtained. Here, when the first shield plate 51 and the second shield plate 52 are in direct contact with each other while the first shield plate 51 and the second shield plate 52 have unevenness, electric contact between the first shield plate 51 and the second shield plate 52 may be insufficient. Then, an eddy current generated in the first shield plate 51 rarely moves to the second shield plate 52. Therefore, a path of the eddy current rarely changes even when an overlapping state of the holes 61 and 62 of both the first shield plate 51 and the second shield plate 52 changes.

When the electrically conductive sheet member 53 is provided, the sheet member 53 may closely come into contact with (that is, come into close contact with) the first shield plate 51 and the second shield plate 52. It is possible to ensure electric connection between the first shield plate 51 and the second shield plate 52 by providing the sheet member 53 that can come into close contact with an uneven shape of the first shield plate 51 and the second shield plate 52. The sheet member 53 may be a deformable material, for example, a gel-like material containing metal powder.

According to the power reception coil device 5D, an overlapping state of the eddy current interrupter 40D may be changed by adjusting a position of the second shield plate 52 with respect to the first shield plate 51 using the moving mechanism 70. In this way, the path of the eddy current changes. When the power transmission coil portion 13 and the power reception coil portion 23 are separated from each other to some extent, the magnetic flux from the power transmission coil portion 13 rarely interlinks with the first shield plate 51 and the second shield plate 52. For this reason, an overlapping state between the holes 61 which is an eddy current interrupter of the first shield plate 51 and the holes 62 which is an eddy current interrupter of the second shield plate 52 is decreased, and a penetration part as a whole of the plurality of shield plates 51 and 52 is decreased. In this way, a function of preventing magnetic flux from leaking to the surrounding (that is, a shielding function) is ensured. Here, the shield plates 51 and 52 originally have this function. When the power transmission coil portion 13 and the power reception coil portion 23 approach each other, an influence of the eddy current increases. The overlapping state between the holes 61 which is an eddy current interrupter of the first shield plate 51 and the holes 62 which is an eddy current interrupter of the second shield plate 52 is increased, and the penetration part as a whole of the plurality of shield plates 51 and 52 is increased. In this way, a function of blocking an eddy current is exerted.

Figure 8:
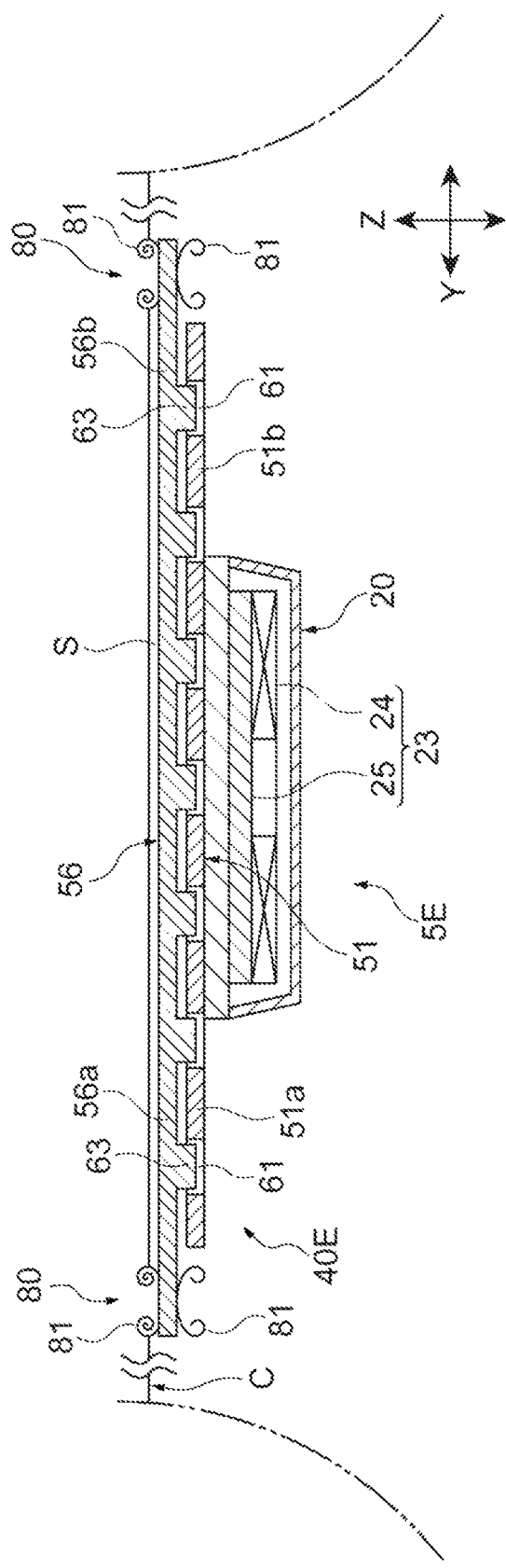
FIG. 8 is a side sectional view schematically illustrating a wireless power transfer system according to a fourth embodiment of this disclosure.

A description will be given of a power reception coil device 5E according to a fourth embodiment with reference to FIG. 8. The power reception coil device 5E is different from the above-described power reception coil device 5D in that a second shield plate (second nonmagnetic member) 56 provided with a convex portion 63 fit to a hole 61 of a first shield plate 51 is included instead of the second shield plate 52 provided with the holes 62, and a moving mechanism 80 for moving the second shield plate 56 in the vertical direction Z is included instead of the moving mechanism 70. An eddy current interrupter 40E including the hole 61 and the convex portion 63 is provided in the first shield plate 51 and the second shield plate 56.

Moving mechanisms 80 and 80 are provided at both ends of the second shield plate 56. The moving mechanism 80 includes a plurality of bimetals 81 provided on an upper surface side and a lower surface side of the both ends of the second shield plate 56. The bimetals 81 can be deformed according to a temperature change. More specifically, both ends of the bimetal 81 are fixed to pins, etc. (not illustrated) attached to the chassis C around a corner of the second shield plate 56, and are normally wound around the pins, etc. For example, a cooling device (not illustrated) including a Peltier element is connected to the bimetal 81. When a temperature of the bimetal 81 is controlled by the cooling device, the second shield plate 56 is pressed by deformation of the bimetal 81 and is moved by a predetermined distance. Such a configuration enables the second shield plate 56 to move in the vertical direction Z. The moving mechanism 80 moves the second shield plate 56 such that overlapping between the hole 61 and the convex portion 63 decreases as a distance between a power transmission coil portion 13 and a power reception coil portion 23, that is, a gap G decreases. For example, the gap G is measured by a height sensor (not illustrated). For example, the height sensor is provided in a suspension of the electric vehicle EV, and detects a change in vehicle height by measuring a sinking amount of the vehicle with respect to a predetermined reference position as a magnetic displacement or a resistance displacement. In addition, a laser displacement meter installed on the bottom surface of the vehicle body may be used as the height sensor to directly measure a change in the distance to the road surface.

The convex portion 63 of the second shield plate 56 is provided to correspond to the hole 61 of the first shield plate 51. For example, the convex portion 63 is equal in size and number to the hole 61. The second shield plate 56 includes protrusions 56a and 56b. Although not illustrated, the second shield plate 56 may include a protrusion that protrudes in the left-right direction X as illustrated in FIG. 2. The convex portion 63 of the second shield plate 56 is provided across a projection region obtained by projecting the power reception coil portion 23 in the vertical direction Z and the protrusions 56a and 56b. A hole may be provided in the second shield plate 56 and a convex portion may be provided on the first shield plate 51.

According to the power reception coil device 5E, when the power transmission coil portion 13 and the power reception coil portion 23 are separated from each other to some extent (when the gap G is large), magnetic flux from the power transmission coil portion 13 rarely interlinks with the first shield plate 51 and the second shield plate 56. For this reason, the hole 61 and the convex portion 63 are fit to each other using the moving mechanism 80 to reduce overlapping thereof, thereby decreasing a gap (a space in which the hole 61 is left). In this way, a function of preventing magnetic flux from leaking to the surrounding is ensured. Here, the first shield plate 51 and the second shield plate 56 originally have this function. When the power transmission coil portion 13 and the power reception coil portion 23 approach each other (when the gap G decreases), an influence of the eddy current increases. The gap increases when a fit degree between the hole 61 and the convex portion 63 is loosened using the moving mechanism 80. In this way, a function of blocking an eddy current is exerted.

Even though the embodiments of this disclosure have been described above, the invention is not limited to the above embodiments. For example, the nonmagnetic member may not have the rectangular shape. When an obstacle is present in the vehicle body (movable object), a notch, etc. may be appropriately provided in the nonmagnetic member. The nonmagnetic member may not have the plate shape, and may have a block shape. The nonmagnetic member may not be provided as a separate body separated from the housing 20. For example, the base 21 of the housing 20 may be made of a nonmagnetic material, and the base 21 may protrude from a region of the power reception coil portion 23. It is possible to provide the base 21 made of the nonmagnetic material and another nonmagnetic member disposed around the base 21. In this case, eddy current-dependent magnetic flux may be reduced even when the gap G changes by providing the eddy current interrupter in the nonmagnetic member disposed around the base 21.

The power transmission coil portion 13 of the power transmission coil device 4 and the power reception coil portion 23 of the power reception coil device 5 may be solenoid coils.

In the above embodiments, a description has been given of a case in which the elongated hole is formed in the nonmagnetic shield plate as the eddy current interrupter. However, the hole is not limited to the elongated hole, and it is possible to provide a circular or oval hole or provide a square hole. In addition, as the eddy current interrupter, the hole may not be formed, and a concave portion not penetrating therethrough may be provided. A groove that is a concave portion extending in a predetermined direction may be formed as the eddy current interrupter. In these cases, the concave portion is formed in a shape recessed in a facing direction (first direction) of the coil device.

Figure 9:
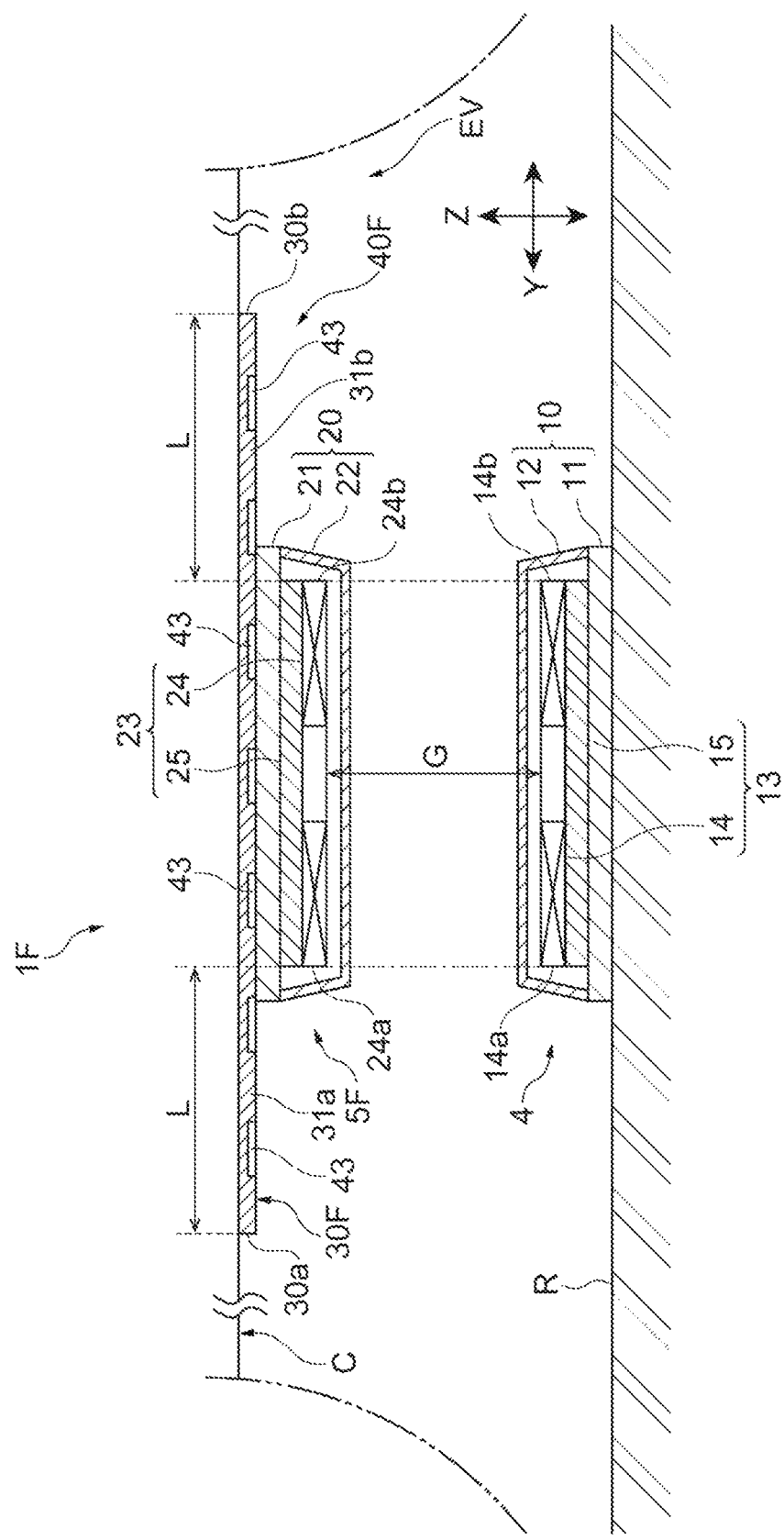
FIG. 9 is a side sectional view schematically illustrating a wireless power transfer system according to a fifth embodiment of this disclosure.

For example, as illustrated in FIG. 9, it is possible to use a shield plate 30F provided with a concave portion 43 as an eddy current interrupter 40F instead of the holes 41 of the eddy current interrupter 40 (see FIG. 1 and FIG. 2). In a power reception coil device 5F of a wireless power transfer system 1F, for example, the concave portion 43 forms a groove shape extending similarly to the hole 41. Since an eddy current flowing through the shield plate 30F flows on a side at which magnetic flux interlinks, that is, a power transmission coil device 4 side in the shield plate 30F, when the concave portion 43 is provided on the power transmission coil device 4 side of the shield plate 30F, the eddy current needs to detour around the concave portion 43. As a result, a distance of a flow of the eddy current becomes longer, and the eddy current becomes smaller. A depth of the concave portion 43 in the vertical direction Z may be twice or more a skin depth inherent to a material of the shield plate 30F. When the depth is defined in this way, it is possible to inhibit the eddy current from flowing. In addition, since the concave portion 43 does not penetrate the shield plate unlike the holes 41, magnetic flux from the power transmission coil device 4 is prevented from leaking to the electric vehicle EV, and a shielding function is ensured.

A water or air cooling device may be combined with the bimetal 81 of the fourth embodiment as a movement control mechanism. A pneumatic actuator may be used as the moving mechanism. In this case, a pump may be included.

This disclosure is not limited to the vehicle body of the vehicle traveling on the ground, and may be applied to another movable object such as an underwater vehicle, etc. A type of movable object is not limited, and examples thereof may include a motorcycle, a bicycle, a train, a water cruiser, an underwater vehicle, and an airplane. A route along which the movable object travels may be a land route, a waterway, or an air route. Even when the movable object is the water cruiser or the underwater vehicle, the gap G may change according to a degree of approach of the movable object with respect to the power transmission coil device 4.

In the above embodiments, a description has been given of a case in which the wireless power transfer system is applied to a system (device) for charging a battery mounted in a vehicle (movable object) such as an electric vehicle, hybrid vehicle, etc. However, the invention is not limited thereto. For example, the invention is applicable to a wireless power transfer system for charging a battery provided in a consumer appliance such as a household electrical appliance, a wireless power transfer system for supplying power to drive industrial equipment (for example, a stage, an arm, a crane, a robot, etc.).

The nonmagnetic member including the eddy current interrupter may not be applied to the power reception coil device. The nonmagnetic member including the eddy current interrupter may be applied to the power transmission coil device. In this case, the power transmission coil device corresponds to a first coil device of claims.

INDUSTRIAL APPLICABILITY

According to some aspects of this disclosure, a change in inductance of a second coil portion corresponding to the other side with regard to power transmission and reception is suppressed even when a gap changes.

REFERENCE SIGNS LIST 1 wireless power transfer system
1A wireless power transfer system
1F wireless power transfer system
4 power transmission coil device (second coil device)
4A power transmission coil device
5 power reception coil device (first coil device)
5A power reception coil device
5B power reception coil device
5C power reception coil device
5D power reception coil device
5E power reception coil device
5F power reception coil device
10 housing
13 power transmission coil portion (second coil portion)
13A power transmission coil portion
14 conductive wire
14A conductive wire
15 ferrite plate
15A ferrite plate
20 housing
23 power reception coil portion (first coil portion)
24 conductive wire
25 ferrite plate
30 shield plate
30A shield plate
30B shield plate
30C shield plate
31$a$ protrusion
31$b$ protrusion
31$c$ protrusion
31$d$ protrusion
40 eddy current interrupter 40A eddy current interrupter
40B eddy current interrupter
40C eddy current interrupter
40D eddy current interrupter
40E eddy current interrupter
41 holes
43 concave portion
51 first shield plate (first nonmagnetic member)
51a protrusion
51b protrusion
52 second shield plate (second nonmagnetic member)
52a protrusion
52b protrusion
53 sheet member
56 second shield plate (second nonmagnetic member)
56a protrusion
56b protrusion
61 hole (first hole)
62 hole (second hole)
63 convex portion
70 moving mechanism
71 fixed portion
72 moving portion
80 moving mechanism
81 bimetal
C chassis
EV electric vehicle (movable object)
G gap
X left-right direction (second direction)
Y front-rear direction (second direction)
Z vertical direction (first direction)

The invention claimed is:

1. A first coil device that faces a second coil device in a first direction and wirelessly performs power transmission or power reception, the first coil device comprising:

a first coil portion that faces a second coil portion of the second coil device in the first direction and includes a conductive wire;

at least one nonmagnetic member that includes a protrusion protruding to an outside of the first coil portion in a second direction orthogonal to the first direction;

the nonmagnetic member includes an eddy current interrupter that interrupts a part of an eddy current generated in the nonmagnetic member;

the nonmagnetic member includes a hollow portion recessed to an opposite side from a side facing the second coil portion in the first direction such that the protrusion extends from within the recessed hollow portion, down a side wall defining the recess of the hollow portion and outward from the recessed hollow Portion in the second direction;

the protrusion having a discontinuous portion in a portion of the protrusion extending down the side wall such that the hollow portion is disconnected from a portion of the protrusion that extends outward from the recessed hollow portion in the second direction; and the first coil portion is located within the hollow portion.

2. The first coil device according to claim 1, wherein the eddy current interrupter is provided in the protrusion.

3. The first coil device according to claim 1, wherein the first coil portion and the second coil portion are circular type coils.

4. The first coil device according to claim 1, wherein the eddy current interrupter is a hole penetrating the nonmagnetic member in the first direction or a concave portion recessed in the first direction.

5. The first coil device according to claim 1 wherein an eddy current interrupter is not included in non-protrusion portions of the nonmagnetic member.

* * * * *